(12) United States Patent
Choi et al.

(10) Patent No.: US 12,485,844 B2
(45) Date of Patent: Dec. 2, 2025

(54) SHROUD STRUCTURE

(71) Applicants: Hyundai Motor Company, Seoul (KR); Kia Corporation, Seoul (KR); Hyundai Mobis Co., Ltd., Seoul (KR)

(72) Inventors: Yong Won Choi, Seoul (KR); Ji Yun Ha, Gyeonggi-do (KR); Dae Hee Lee, Incheon (KR); Seung Cheol Kim, Gyeonggi-do (KR)

(73) Assignees: Hyundai Motor Company, Seoul (KR); Kia Corporation, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/611,949

(22) Filed: Mar. 21, 2024

(65) Prior Publication Data

US 2025/0170978 A1 May 29, 2025

(30) Foreign Application Priority Data

Nov. 28, 2023 (KR) ......................... 10-2023-0167391

(51) Int. Cl.
*B60R 21/05* (2006.01)
*B62D 1/183* (2006.01)
*B62D 1/187* (2006.01)

(52) U.S. Cl.
CPC .............. B60R 21/05 (2013.01); B62D 1/187 (2013.01)

(58) Field of Classification Search
CPC ......... B60R 21/02; B60R 21/04; B60R 21/05; B62D 1/18; B62D 1/187

USPC .................................. 74/492, 493; 280/775
See application file for complete search history.

(56) References Cited

U.S. PATENT DOCUMENTS

| | | | | |
|---|---|---|---|---|
| 5,806,377 A | * | 9/1998 | Noda | B62D 1/16 |
| | | | | 74/552 |
| 11,866,097 B2 | * | 1/2024 | Kim | B62D 25/20 |
| 2017/0050665 A1 | * | 2/2017 | Appleyard | B62D 1/195 |
| 2020/0130723 A1 | * | 4/2020 | Cao | B62D 1/183 |

FOREIGN PATENT DOCUMENTS

| KR | 20040110135 A | * | 12/2004 |
|---|---|---|---|
| KR | 10-2383374 B1 | | 4/2022 |

OTHER PUBLICATIONS

Description Translation for KR 2004/0110135 from Espacenet (Year: 2004).*

* cited by examiner

*Primary Examiner* — James A English
*Assistant Examiner* — Daniel M. Keck
(74) *Attorney, Agent, or Firm* — Fox Rothschild LLP

(57) ABSTRACT

Disclosed is a shroud structure for a telescopic steering wheel of a vehicle, the shroud structure including a column elastically coupled to a fixture, and a shroud assembly disposed to surround the column and being movable together with the column, wherein the shroud assembly includes a first shroud and a second shroud, and wherein the second shroud is rotatably coupled to the first shroud.

19 Claims, 9 Drawing Sheets

SHROUD STRUCTURE

CROSS-REFERENCE TO RELATED APPLICATION

This application claims, under 35 U.S.C. § 119(a), the benefit of Korean Patent Application No. 10-2023-0167391, filed on Nov. 28, 2023, the entire contents of which are incorporated herein by reference.

BACKGROUND

Technical Field

The present disclosure relates to a shroud structure. More particularly, it relates to a shroud structure for a telescopic steering wheel of a vehicle.

Background

An autonomous vehicle is a vehicle capable of traveling without driver intervention. The autonomous vehicle may include, like a general vehicle, a steering wheel, accelerator pedal, and brake pedal to enable manual traveling by a driver in addition to autonomous traveling.

While an autonomous vehicle travels, there is no need to manipulate the steering wheel. In this case, the steering wheel may be stored in the vehicle in a direction away from a vehicle compartment to secure a wide and comfortable space around a driver's seat.

In a general vehicle, the steering wheel may be tilted for driver's convenience. In this sense, a telescopic steering wheel has been introduced so that the steering wheel protruding toward the driver's seat may change in length.

For the convenience of passengers during autonomous traveling in the autonomous vehicle, the steering wheel needs to be stored in a direction away from the driver's seat, e.g., stored in a space within the front portion of the vehicle or inside a crash pad at the lower portion of a cluster. In the autonomous vehicle, the movement amount of the steering wheel to be stored becomes greater than that in the general vehicle. Here, the steering wheel-related structures interfere excessively with peripheral parts inside the crash pad at the lower portion of the cluster, e.g., the column mounting portion of a cowl crossbar. Moreover, because the steering wheel needs to be stored in a state of being folded to one side, the tilting condition of the steering wheel also needs to be considered.

The above information disclosed in this Background section is only for enhancement of understanding of the background of the present disclosure, and therefore it may contain information that does not form the prior art that is already known to one having ordinary skill in the art.

SUMMARY OF THE DISCLOSURE

The present disclosure has been made in an effort to solve the above-described problems associated with the existing technologies, and it is an object of the present disclosure to provide a shroud structure capable of realizing long telescoping of a steering wheel in an autonomous vehicle.

Another object of the present disclosure is to provide a shroud structure which allows the steering wheel of the vehicle to be stored without interfering other parts.

The object of the present disclosure is not limited to the foregoing, and other objects not mentioned herein will be clearly understood by one having ordinary skill in the art to which the present disclosure pertains based on the description below.

The features of the present disclosure to achieve the object of the present disclosure as described above and perform the characteristic functions of the present disclosure to be described later are as follows.

In one aspect, the present disclosure provides a shroud structure including a column coupled to a fixture, and a shroud assembly disposed to surround the column and being movable together with the column. Here, the shroud assembly may include a first shroud and a second shroud, and the second shroud may be rotatably coupled to the first shroud.

A first side of the second shroud may be rotatably coupled to the first shroud, and a second side of the second shroud may be rotatably coupled to the fixture.

The first side may be hinged to the first shroud.

The shroud structure may further comprise a link assembly configured to rotatably connect the second side to the fixture and being elastic.

The link assembly may comprise a first link rotatably coupled to the fixture; and a second link coupled to the first link and rotatably coupled to the second shroud, wherein the first link and the second link may be configured to move relative to each other.

The link assembly may further comprise a spring disposed between the first link and the second link. The link assembly may be configured to be maintained in an elongated state by the spring.

The first shroud may include a first shroud portion disposed to surround an upper portion of the column; and a second shroud portion coupled to the first shroud portion and disposed to surround a lower portion of the column.

The first shroud portion and the second shroud portion may be integrated with or separated from each other.

The fixture may be a vehicle, and the column may be a steering column to which a telescopic steering wheel of the vehicle is mounted.

The second shroud may be rotatably coupled to a crash pad of the vehicle.

The column may be movably, elastically, or telescopically coupled to the fixture.

In another aspect, the present disclosure provides a shroud structure including a steering column coupled to the vehicle body of a vehicle, and a shroud assembly disposed to surround the steering column and being movable together with the steering column. Here, the shroud assembly may include a first shroud and a second shroud, and the first shroud may be fixedly mounted, and the second shroud may be rotatably coupled to the first shroud.

A first side of the second shroud may be rotatably coupled to the first shroud via a pivot point. A second side of the second shroud may be rotatably coupled to a crash pad of the vehicle.

The steering column may have a steering wheel mounted thereto.

The shroud structure may further comprise a link assembly configured to rotatably connect the second side to the vehicle body and being elastic.

The link assembly may include: a first link rotatably coupled to the vehicle body; and a second link coupled to the first link and rotatably coupled to the second shroud, wherein the first link and the second link may be configured to move relative to each other.

The link assembly may further comprise a spring disposed between the first link and the second link.

In still another aspect, the present disclosure provides a vehicle including the shroud structure.

Other aspects and preferred embodiments of the present disclosure are discussed infra.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
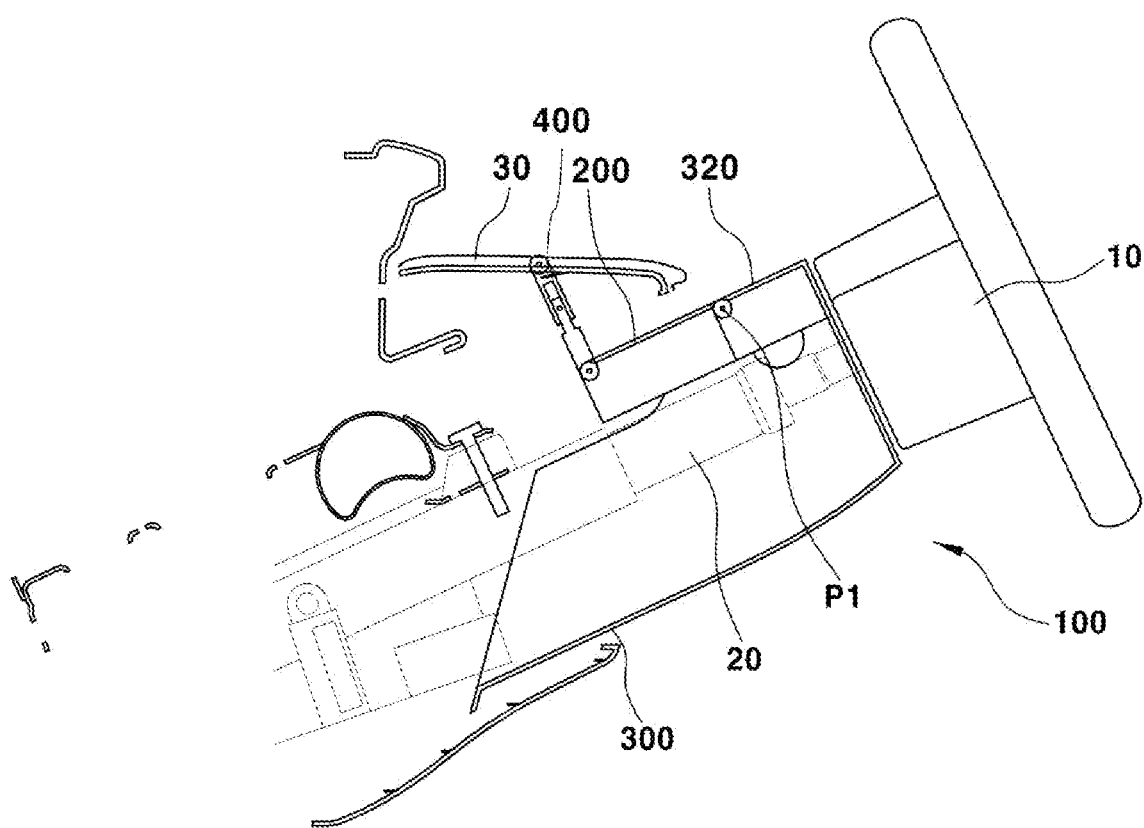
FIG. 1 illustrates a shroud structure according to an exemplary embodiment of the present disclosure.

It should be understood that the appended drawings are not necessarily to scale, presenting a somewhat simplified representation of various preferred features illustrative of the basic principles of the present disclosure. The specific design features of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Descriptions of specific structures or functions presented in the embodiments of the present disclosure are merely exemplary for the purpose of explaining the embodiments according to the concept of the present disclosure, and the embodiments according to the concept of the present disclosure may be implemented in various forms. In addition, the descriptions should not be construed as being limited to the embodiments described herein, and should be understood to include all modifications, equivalents and substitutes falling within the idea and scope of the present disclosure.

Meanwhile, in the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of exemplary embodiments of the present disclosure.

It will be understood that, when a component is referred to as being "connected to" or "brought into contact with" another component, the component may be directly connected to or brought into contact with the other component, or intervening components may also be present. In contrast, when a component is referred to as being "directly connected to" or "directly brought into contact with" another component, there is no intervening component present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for the purpose of illustrating embodiments and is not intended to limit the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

Hereinafter, the present disclosure is described in detail with reference to the accompanying drawings.

As illustrated in FIG. 1, a steering wheel 10 may be connected to a steering column 20. The steering wheel 10 may be a telescopic steering wheel. A driver seated in a driver's seat may adjust the distance between the driver and the steering wheel. Moreover, the steering wheel 10 may be tiltable, whereby the angle at which the steering wheel 10 is directed toward the driver may be adjusted. Although not illustrated in the drawing, a driving portion, such as a motor, configured to move the steering wheel 10 may be provided.

The steering column 20 may be movably, elastically, or telescopically mounted to a vehicle body B. The central axis of the steering wheel 10 may be connected to one end of the steering column 20. Therefore, the steering wheel 10 may move in a direction toward the driver's seat of the vehicle (telescoping out) or in a direction away from the driver's seat of the vehicle (telescoping in).

A shroud assembly 100 may be mounted around the circumference of the steering column 20. The shroud assembly 100 may protect the steering column 20 by preventing the steering column 20 from being exposed outside. The shroud assembly 100 may operate in conjunction with the steering column 20. In other words, the shroud assembly 100 may move together with the steering column 20. Therefore, when the movement distance of the steering column 20 increases, the shroud assembly 100 surrounding the steering column 20 may interfere with peripheral parts. For this reason, the steering wheel 10 may generally move toward the front of the vehicle by about 30 mm. However, as described above, when the vehicle is in an autonomous traveling mode, the steering wheel 10 needs to be stored deep into a space, e.g., a space under the hood, other than the interior of the vehicle. For example, for a next-generation vehicle, such as an autonomous vehicle, a structure with a long telescoping length enabling the steering wheel 10 to be stored at a depth of 150 mm or more is becoming a technical goal. In this regard, the shroud structure according to the present disclosure enables long telescoping of the steering wheel while avoiding interference with peripheral parts.

The shroud assembly 100 may be disposed to surround the circumference of the steering column 20 and includes a fixed portion and a movable portion. A first shroud 300, 320, which is the fixed portion, may be fixed to the circumference of the steering column 20. A second shroud 200, which is the movable portion, may move with respect to the first shroud 300, 320, and may be movably mounted to the vehicle body or to a crash pad 30, which is a fixture.

Meanwhile, the meanings of fixation and movement in this specification should be recognized to be relative. For example, although the vehicle body is referred to as a fixture in some parts of this specification, this is a relative concept and does not exclude that the vehicle body is a moving body that moves due to the traveling of the vehicle. The vehicle body referred to as a fixture distinguishes between a fixed portion and a movable portion within the vehicle. In other words, for example, because the shroud assembly 100, the steering column 20, and the steering wheel 10 may move relative to the vehicle body B, it may be easily understood that the vehicle body is referred to as a fixture.

In one implementation, the first shroud 300, 320 may include a first shroud portion 320 and a second shroud portion 300. The first shroud portion 320 is disposed at an upper portion of the steering column 20. The second shroud portion 300 may be disposed at a lower portion of the steering column 20. For convenience of installation and removal of the first shroud 300, 320, the first shroud portion 320 and the second shroud portion 300 may be separated from each other but may be mounted in different directions with respect to the steering column 20 and be coupled to and fixed to each other. However, in some implementations, the first shroud portion 320 may be integrated with the second shroud portion 300.

The second shroud 200 may be rotatably coupled to the first shroud 300, 320. The second shroud 200 may rotate about a pivot point P1 with respect to the first shroud 300, 320.

Moreover, the second shroud 200 may be rotatably coupled to a fixture within the vehicle, such as the crash pad 30 or the vehicle body B. For example, the second shroud 200 may be rotatably coupled to the crash pad 30. The crash pad 30 may be located in front of the driver's seat in the vehicle compartment and may be located at an upper portion of the shroud assembly 100. In one implementation, the second shroud 200 may be connected to the crash pad 30 via an elastic link assembly 400.

Figure 2:
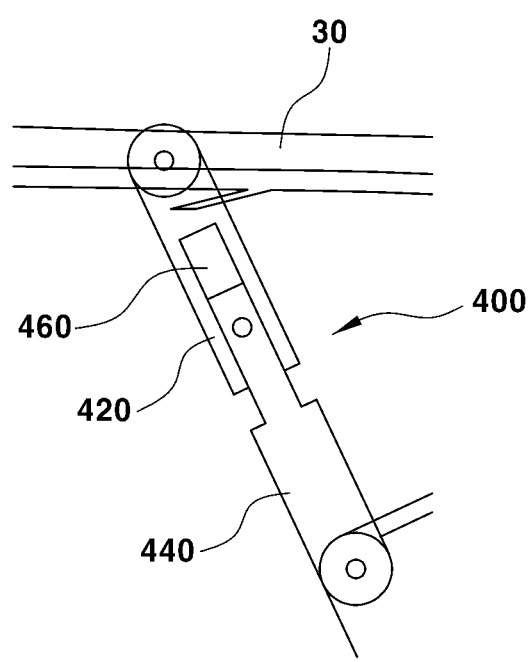
FIG. 2 illustrates a link assembly of a shroud structure according to an exemplary embodiment of the present disclosure.

Referring to FIG. 2, the link assembly 400 may include at least two links 420, 440. The at least two links include a first link 420 and a second link 440. The first link 420 and the second link 440 may be coupled to each other to enable relative movement or sliding with respect to each other.

The first link 420 of the link assembly 400 may be rotatably connected to the crash pad 30. The second link 440 may be rotatably connected to the second shroud 200. For example, the first link 420 and the second link 440 of the link assembly 400 may be hinged to the crash pad 30 and to the second shroud 200, respectively.

In one implementation, the link assembly 400 may further include a spring 460. The spring 460 may be disposed within the link assembly 400 to prevent the first link 420 and the second link 440 from fluctuating.

Figure 3:
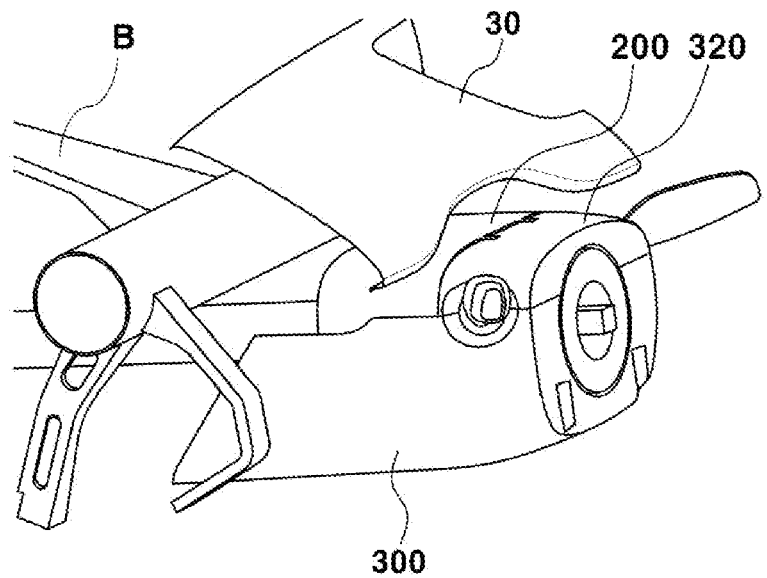
FIGS. 3 to 5 illustrate a shroud structure according to an exemplary embodiment of the present disclosure being in a normal state.
Figure 4:
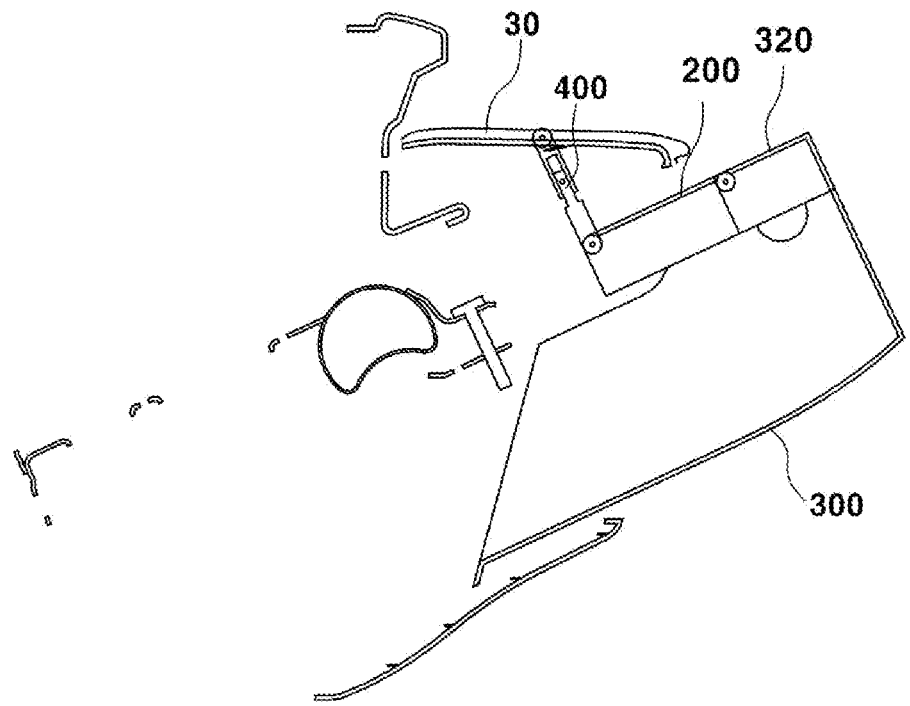
Figure 5:
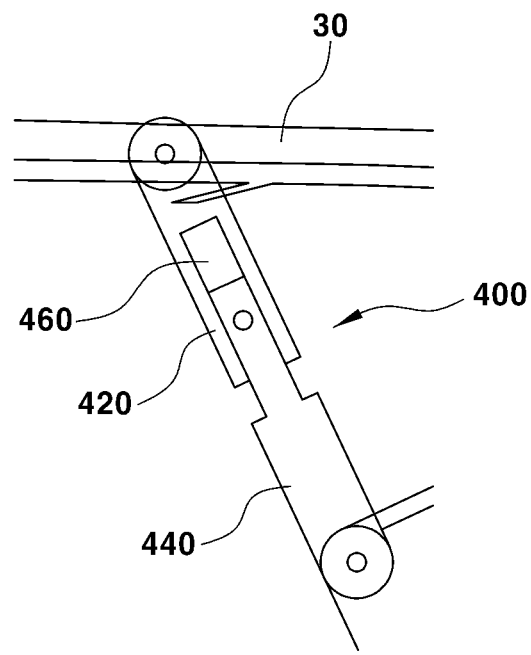
Figure 6:
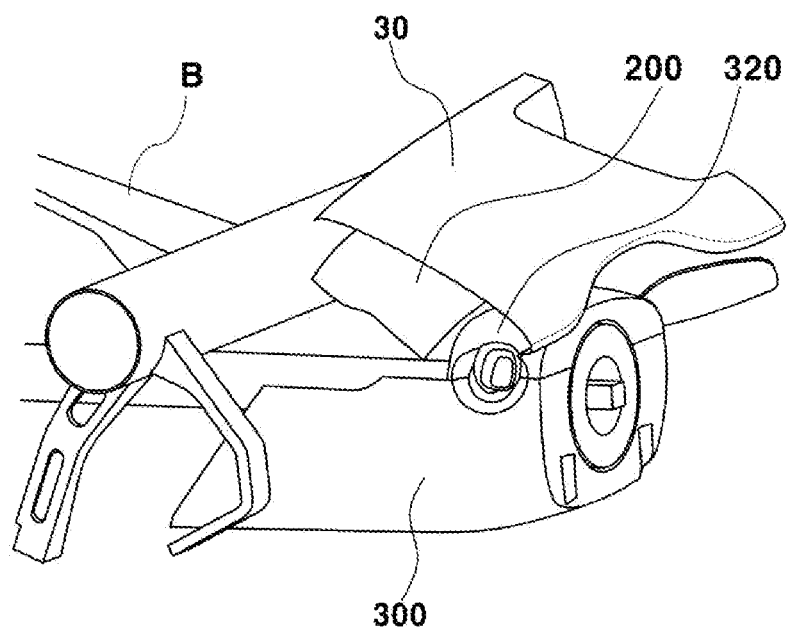
FIGS. 6 to 8 illustrate a state in which a shroud structure according to an exemplary embodiment of the present disclosure is telescoped in by a first value.
Figure 7:
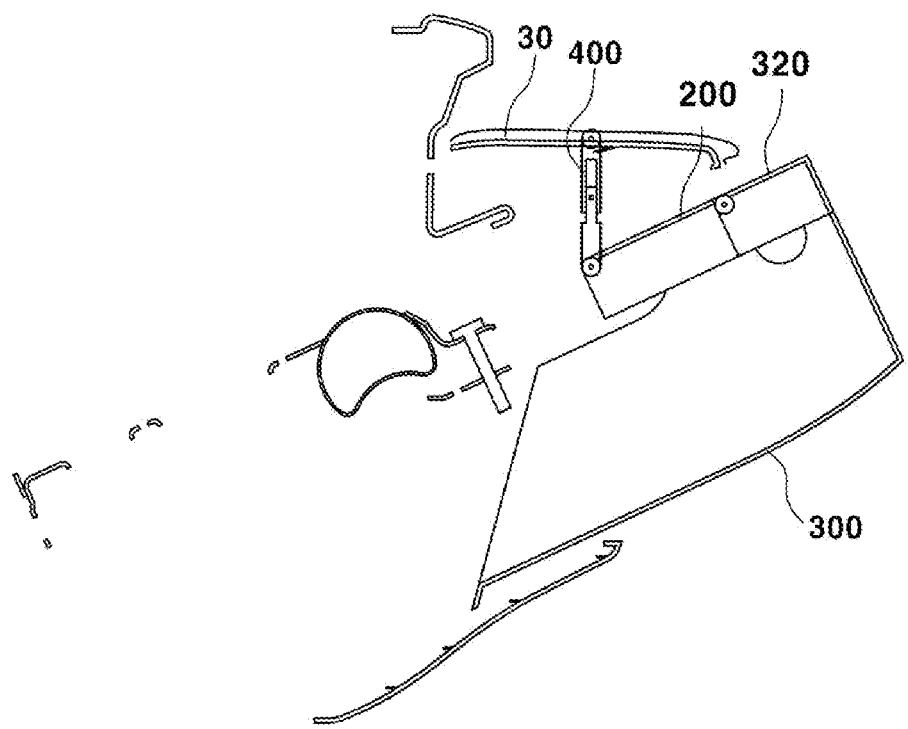
Figure 8:
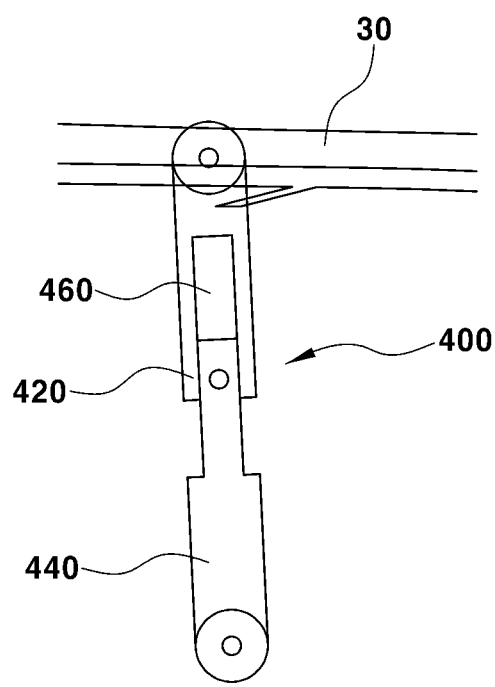
Figure 9:
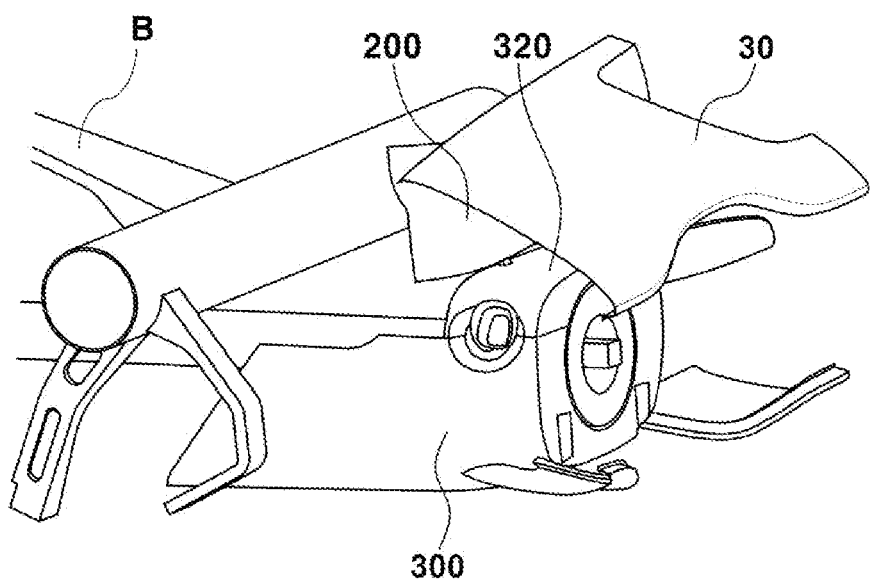
FIGS. 9 to 11 illustrate a state in which a shroud structure according to an exemplary embodiment of the present disclosure is telescoped in by a second value.
Figure 10:
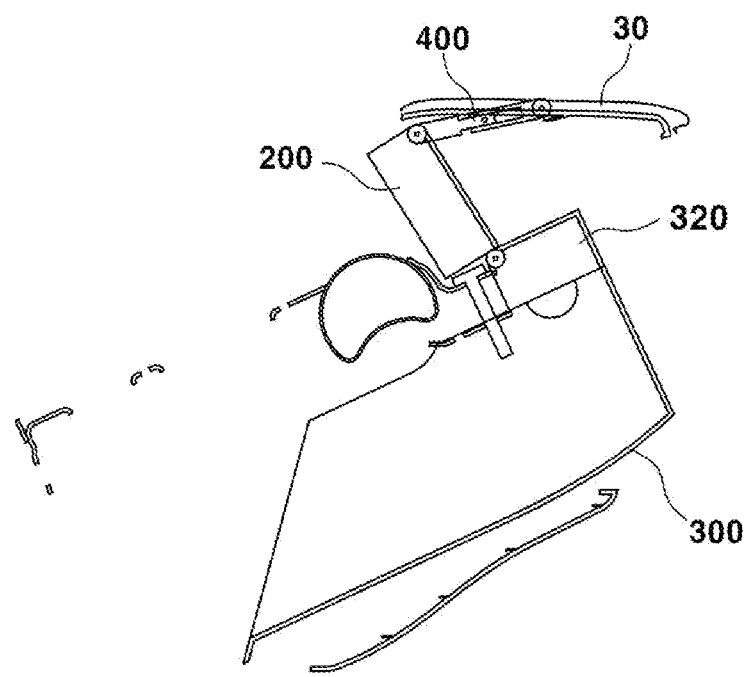
Figure 11:
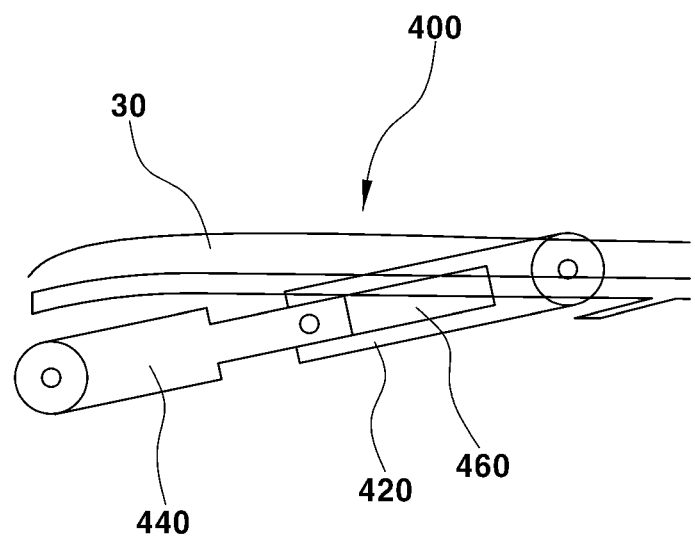

FIGS. 3 to 5 illustrate the state of the shroud assembly 100 when the shroud structure according to an exemplary embodiment of the present disclosure is in a normal reference position. FIGS. 6 to 8 illustrate a state in which the steering wheel 10 is telescoped in by a first value (e.g., a depth of 30 mm). FIGS. 9 to 11 illustrate a state in which the steering wheel 10 is long telescoped in by a second value (e.g., a depth of 150 mm).

The state illustrated in FIGS. 3 to 5 may be viewed as when the vehicle is in a manual traveling mode. In this state, the steering wheel 10 may be tilted and moved in a direction toward the driver's seat. As illustrated in FIG. 5, the elastic link assembly 400 may prevent the second shroud 200 from being spaced apart from the first shroud 300, 320 or from the first shroud portion 320.

FIGS. 6 to 8 illustrate a state during the steering wheel 10 is being stored. The link assembly 400 may be elongated to react the movement of the steering wheel 10. In this state, the steering wheel 10 may be tilted and be moved toward the driver's seat. However, when the steering wheel 10 is stored at a depth greater than the first value, e.g., 30 mm, the link assembly 400 may no longer be able to be elongated.

Then, as illustrated in FIGS. 9 to 11, the second shroud 200 may rotate with respect to the crash pad 30 and move up simultaneously while rotating with respect to the first shroud 300, 320 about the pivot point P1. In this state, the shroud assembly 100 may avoid interference with peripheral parts, such as the column mounting portion of a cowl crossbar. Here, the link assembly 400 may be maintained in the elongated state by the reaction force of the spring 460 pushing the first link 420 and the second link 440.

As such, according to the present disclosure, provided is the shroud assembly capable of being long telescoped in a direction away from the driver's seat.

As is apparent from the above description, the present disclosure provides the following effects.

According to the present disclosure, provided is a shroud structure capable of realizing long telescoping of a steering wheel in a vehicle, particularly, an autonomous vehicle.

According to the present disclosure, provided is a shroud structure enabling a steering wheel of a vehicle to be stored without interfering other parts.

Effects of the present disclosure are not limited to what has been described above, and other effects not mentioned herein will be clearly recognized by those skilled in the art based on the above description.

It will be apparent to those of ordinary skill in the art to which the present disclosure pertains that the present disclosure described above is not limited by the above-described embodiments and the accompanying drawings, and various substitutions, modifications and changes are possible within a range that does not depart from the technical idea of the present disclosure.

What is claimed is:

1. A shroud structure comprising:
   a column coupled to a fixture; and
   a shroud assembly disposed to surround the column and being movable together with the column,
   wherein the shroud assembly comprises a first shroud and a second shroud that is rotatably coupled to the first shroud, wherein a first side of the second shroud is rotatably coupled to the fixture.

2. The shroud structure of claim 1, wherein a second side of the second shroud is rotatably coupled to the first shroud.

3. The shroud structure of claim 2, wherein the second side is hinged to the first shroud.

4. The shroud structure of claim 2, further comprising a link assembly configured to rotatably connect the first side of the second shroud to the fixture, the link assembly being elastic.

5. The shroud structure of claim 4, wherein the link assembly comprises:
   a first link rotatably coupled to the fixture; and
   a second link coupled to the first link and rotatably coupled to the second shroud, wherein the first link and the second link are configured to move relative to each other.

6. The shroud structure of claim 5, wherein the link assembly further comprises a spring disposed between the first link and the second link.

7. The shroud structure of claim 6, wherein the link assembly is configured to be maintained in an elongated state by the spring.

8. The shroud structure of claim 1, wherein the first shroud comprises:
   a first shroud portion disposed to surround an upper portion of the column; and
   a second shroud portion coupled to the first shroud portion and disposed to surround a lower portion of the column.

9. The shroud structure of claim 8, wherein the first shroud portion and the second shroud portion are integrated with or separated from each other.

10. The shroud structure of claim 9, wherein the second shroud is rotatably coupled to a crash pad of a vehicle.

11. The shroud structure of claim 1, wherein the fixture is a vehicle body, and the column is a steering column to which a steering wheel of a vehicle is mounted.

12. The shroud structure of claim 1, wherein the column is movably, elastically, or telescopically coupled to the fixture.

13. A vehicle comprising the shroud structure of claim 1.

14. A shroud structure comprising:
   a steering column coupled to a vehicle body of a vehicle; and
   a shroud assembly disposed to surround the steering column and being movable together with the steering column,
   wherein the shroud assembly comprises a first shroud and a second shroud, and wherein the first shroud is fixedly mounted to the steering column, and the second shroud is rotatably coupled to the first shroud, wherein a first side of the second shroud is rotatably coupled to a crash pad of the vehicle.

15. The shroud structure of claim 14, wherein a second side of the second shroud is rotatably coupled to the first shroud via a pivot point.

16. The shroud structure of claim 14, wherein the steering column has a steering wheel mounted to the steering column.

17. The shroud structure of claim 14, further comprising a link assembly configured to rotatably connect the first side to the vehicle body, the link assembly being elastic.

18. The shroud structure of claim 17, wherein the link assembly comprises:
   a first link rotatably coupled to the vehicle body; and
   a second link coupled to the first link and rotatably coupled to the second shroud, wherein the first link and the second link are configured to move relative to each other.

19. The shroud structure of claim 18, wherein the link assembly further comprises a spring disposed between the first link and the second link.

* * * * *